UNITED STATES PATENT OFFICE 2,436,134

PRODUCTION OF CHLORINE DIOXIDE

Royden N. Aston, Niagara Falls, N. Y., assignor to The Mathieson Alkali Works, Inc., New York, N. Y., a corporation of Virginia No Drawing. Application March 12, 1945, Serial No. 582,409

5 Claims. (Cl. 23—152)

This invention relates to the manufacture of chlorine dioxide and more particularly to an improved process for the production of chlorine dioxide from salts of chlorous acid.

It has previously been known that chlorine dioxide may be produced by acidification of solutions of chlorites and also by the treatment of solid chlorites with acids, particularly the strong inorganic acids. Furthermore, certain organic acids, relatively stable towards such oxidizing agents as chlorites and chlorine dioxide, and sufficiently strong as acids, are known to react with chlorites to form chlorine dioxide. In general, as the pH of a chlorite solution decreases from about 6, the evolution of chlorine dioxide increases.

It would not be expected that the adding of an organic acid anhydride to a chlorite solution would be any more effective in producing chlorine dioxide than the addition of an equivalent amount of the corresponding organic acid. Furthermore, it would be expected that the addition of an organic acid anhydride to a chlorite solution buffered at an alkaline pH would have no effect in liberating chlorine dioxide, since the addition of organic acids has no effect under such conditions, provided, of course, the capacity of the buffer is not exceeded.

I have found quite unexpectedly, however, that organic acid anhydrides react with chlorites to generate chlorine dioxide under conditions under which the equivalent amount of the corresponding organic acid is ineffectual to liberate chlorine dioxide. Further, under conditions under which an organic acid causes the generation of only small amounts of chlorine dioxide due to acidification, I have found that the equivalent amount of the corresponding anhydride generates far more chlorine dioxide than can be attributed to acidification alone.

Organic acid anhydrides effective according to this invention include both open chain and cyclic anhydrides. The anhydride should be at least slightly soluble in water. In the aromatic series, the anhydrides of polybasic acids, such as phthalic acid, are preferred to other anhydrides of this series. Substituted aromatic acid anhydrides may be used, provided readily oxidizable substituents are avoided. Among suitable substituent groups may be mentioned: the halogens—fluorine, chlorine, bromine and iodine—alkoxy—such as methoxy, ethoxy, tertiary-butoxy and the like—$NO_2$ and $SO_3H$. Such groups possess relatively high stability toward oxidation as compared with amino, aldehydo and similar groups which are readily oxidizable.

Aliphatic polybasic carboxylic acids, for example, succinic, glutaric, glutaconic, maleic, etc., form heterocyclic anhydrides which are suitable for use according to the invention. The anhydrides of the saturated aliphatic polybasic acids, e. g., succinic and glutaric, are preferred to the anhydrides of the unsaturated aliphatic polybasic acids since they are more stable in the presence of oxidizing agents. Substituents of the types mentioned as suitable with respect to aromatic acid anhydrides may be present, often with advantage. Thus, chlorosuccinic anhydride exhibits greater stability toward hydrolysis than succinic anhydride.

Because of their ready availability and greater effectiveness, the anhydrides of the saturated monobasic aliphatic acids are particularly preferred for use in the process of the invention. These are exemplified by the anhydrides of acetic, propionic, butyric, and isobutyric acids and by the anhydrides of the higher molecular weight fatty acids, e. g., stearic acid. As in the case of the aromatic acid anhydrides and the anhydrides derived from polybasic aliphatic acids, stable substituents may be present. Thus, the anhydrides of chloroacetic, ethoxyacetic, and nitropropionic acids may be used. The anhydrides of substituted or unsubstituted unsaturated open chain monobasic acids may be employed in the present process when they are sufficiently stable toward chlorine dioxide and chlorites.

Mixed anhydrides, such as acetobutyric anhydride, $CH_3CO.O.COC_3H_7$, containing different acid residues in the same molecule, are not excepted from the scope of the present invention. Also, it may be advantageous in some cases to use mixtures of anhydrides, for example, a mixture of acetic and butyric anhydrides.

Through the use of mixed anhydrides or mixtures of anhydrides, it is possible to control nicely the rate of evolution of chlorine dioxide.

Alkali metal chlorites and alkaline earth metal chlorites are the most readily available salts of chlorous acid and are preferred for use according to the invention, but a wide variety of other salts of chlorous acid, including relatively water-insoluble chlorites, may be employed. Of the alkali and alkaline earth metal chlorites, sodium and calcium chlorites are particularly preferred.

The principle of the present invention may be applied in several ways, but it is usually most advantageous to effect the reaction in aqueous solution. The concentration of the aqueous solution may vary over a considerable range. When using high concentrations of reactants, it is advisable to introduce an inert gas into or immediately above the reacting solution in order to dilute the chlorine dioxide, as generated, to a safe concentration. Gases suitable for this purpose include air, nitrogen, carbon dioxide, or other non-oxidizable or difficultly oxidizing gases. This practice aids in removing chlorine dioxide from the solution and may serve to increase the rate of reaction.

In neutral or alkaline solutions the molar proportion of anhydride and chlorite may with advantage be about 1:1, but a larger proportion of anhydride may be used, particularly when it is desired to obtain the maximum amount of chlorine dioxide from a given amount of chlorite. When less than about 0.25 mole of anhydride per mole of chlorite is used in neutral or alkaline solutions the reaction may be relatively slow and incomplete. However, in solutions having a pH of 6 or less, even less than 0.25 mole of anhydride per mole of chlorite is effective in materially increasing the evolution of chlorine dioxide. Very small proportions of anhydride, relative to chlorite, are needed to accelerate chlorine dioxide evolution from solutions having a pH of 4 or less.

The reaction between chlorites and organic acid anhydrides proceeds at below room temperature as well as at elevated temperatures. At elevated temperatures, the evolution of chlorine dioxide is increased, hence, for the same ratio of $ClO_2$ evolved to chlorite used, less anhydride is necessary. I ordinarily operate at a temperature within the range of from about 20° C. to about 80° C., but lower or higher temperatures may be used.

When the process of the invention is carried out in solution, materials which are acted upon by the generated chlorine dioxide may be present, as may be various processing agents which do not interfere with the reaction such as pH control agents, detergents and the like, including phosphates, polyphosphates, carbonates, percarbonates, hydrogen peroxide, etc.

Chlorine dioxide generated according to the invention, using either pure or impure chlorites, may be employed for example, in the bleaching of oils, fats, flour, textiles or other materials, or it may be converted by chemical reaction into other products.

In the practice of the invention, liquid or solid acid anhydrides may be added to aqueous solutions of chlorites or the vapors of conveniently volatilized anhydrides may be passed, most suitably with air or other inert diluent gas, into chlorite solutions. Vapors of conveniently volatilized anhydrides may also be led into contact with solid chlorites. Thus, a tower may be packed with solid chlorite, preferably in flaked form, and acetic anhydride vapors, for example, passed therethrough. Diluent gas is preferably introduced with the anhydride vapors to the tower which in addition to chlorite may contain inert packing materials such as glass beads or the like. Moisture may be supplied through the medium of the diluent gas or by using hydrated chlorites.

My invention is further illustrated by the following examples which are not to be taken as in any way limiting the scope thereof:

Example I

To four separate 500 cc. portions of a solution each portion containing 0.05 mole of sodium chlorite, adjusted to pH 9 and maintained at room temperature, there were added the amounts of acetic anhydride indicated in the following tabulation. The solutions were aerated for 30 minutes and the chlorine dioxide evolved was absorbed and its quantity determined by titration. The amounts of $ClO_2$ thus evolved were as follows:

| Exp. No. | Acetic Anhydride | | $ClO_2$ Evolved, Mgs. |
| --- | --- | --- | --- |
| | Moles | Moles/moles of Chlorite | |
| 1 | 0.003 | 0.06 | 4.7 |
| 2 | .008 | .16 | 21.2 |
| 3 | .025 | .50 | 36 |
| 4 | .05 | 1.00 | 54 |
| 5 | .10 | 2.00 | 204 |

Example II

To five separate 500 cc. portions of a solution each portion containing 0.05 mole of sodium chlorite, maintained at room temperature, and, by means of suitable buffers, at the respective pH values indicated in the following tabulation, there was added 0.05 mole of acetic anhydride. As a check, a test was also run on a 500 cc. sample of solution containing 0.05 mole of sodium chlorite but no anhydride, maintained at room temperature and at a decidedly acid pH. The solutions were aerated for 30 minutes and the evolved $ClO_2$ was absorbed and its quantity determined by titration. The amounts of $ClO_2$ thus evolved were as follows:

| Exp. No. | pH | | $ClO_2$ Evolved, Mgs. |
| --- | --- | --- | --- |
| | Start | Finish | |
| Blank | 4.0 | 3.9 | 4.6 |
| 1 | 7.0 | 7.0 | 25.4 |
| 2 | 8.1 | 7.3 | 24.3 |
| 3 | 9.1 | 9.0 | 54.0 |
| 4 | 10.1 | 9.8 | 27.0 |
| 5 | 11.9 | 11.7 | 2.3 |

These and other data have shown that, with the same concentration of reagents, the maximum quantity of $ClO_2$ is evolved at a pH of about 9 and that at pH values of this order the maximum yield of $ClO_2$ is usually obtained by using ratios of anhydride to chlorite of about 1:1 or higher. Within the range of pH values of about 7 to 12, the maximum rate of reaction has been obtained at about pH 9.

In contrast with the results obtained in the foregoing blank test, a run carried on under identical conditions, except that 0.0025 mole of acetic anhydride was added, yielded 134.4 milligrams of $ClO_2$. Thus, in either an acid or an alkaline solution, the evolution of $ClO_2$ is greatly increased by the presence of only a very small proportion of an anhydride, but in acid solution, the increase in yield of $ClO_2$ is greater and may be effected by relatively smaller proportions of the anhydride.

Example III

Two 500 cc. portions of a solution each containing 0.05 mole of sodium chlorite were buffered at pH 7. One was heated to 80° C. while the other was held at room temperature. To each there was added 0.0125 mole of acetic anhydride. Each was aerated for 30 minutes and the evolved $ClO_2$ was absorbed and its quantity determined by titration. From the heated solution, 27.8 mg. of $ClO_2$ was obtained while the solution at room temperature yielded only 8.16 mg.

Example IV

To 500 cc. of a solution containing 0.05 moles of sodium chlorite, buffered at pH 9 and held at room temperature there was added 0.05 mole of propionic anhydride. During 30 minutes aeration, 60.2 mg. $ClO_2$ was removed. Similar treatment of a sodium chlorite solution with acetic anhydride (0.05 mole) yielded 54.0 mg. $ClO_2$.

Example V

Air was aspirated through liquid acetic anhydride and then through a tower filled with sodium chlorite in the form of flakes. The exit gases contained considerable quantities of $ClO_2$. When the acetic anhydride was omitted but the air stream continued, the evolution of $ClO_2$ ceased. The evolution of $ClO_2$ was resumed when the air was first passed through the anhydride.

Example VI 500 cc. of an aqueous solution containing 0.05 mole of calcium chlorite, and buffered at pH 9, evolved 61.5 mg. $ClO_2$ when 0.025 mole of propionic anhydride was added.

Example VII 10 parts by weight of sodium hydroxide, 45 parts by weight of sodium chlorite and 45 parts by weight of ortho-sulfobenzoic anhydride were added to 1,000 parts by weight of water. The resulting solution immediately began to evolve chlorine dioxide.

Example VIII

When water vapor is passed through a mixture of powdered sodium chlorite and powdered phthalic anhydride, copious amounts of chlorine dioxide are generated. Alternatively, the phthalic anhydride may be added to a solution of the chlorite. In either case, the generated chlorine dioxide should be diluted to a safe concentration as formed through the use of air or another inert gas.

I claim:

1. A process for the generation of chlorine dioxide which comprises contacting a chlorite with an organic acid anhydride.
2. A process for the generation of chlorine dioxide which comprises contacting a chlorite with an aliphatic acid anhydride.
3. A process for the generation of chlorine dioxide comprising contacting sodium chlorite with acetic anhydride.
4. A process for the generation of chlorine dioxide which comprises contacting a chlorite with vapors of an organic acid anhydride.
5. A process for the generation of chlorine dioxide which comprises contacting sodium chlorite with acetic anhydride vapors.

ROYDEN N. ASTON.

REFERENCES CITED

The following references are of record in the file of this patent:

Karrer, "Organic Chemistry", p. 198. Pub. by Nordemann Publishing Co., New York (1938).